United States Patent
Ikudome et al.

(10) Patent No.: US 6,779,118 B1
(45) Date of Patent: Aug. 17, 2004

(54) USER SPECIFIC AUTOMATIC DATA REDIRECTION SYSTEM

(75) Inventors: Koichiro Ikudome, Arcadia, CA (US); Moon Tai Yeung, Alhambra, CA (US)

(73) Assignee: Auriq Systems, Inc., Pasadena, CA (US)

( * ) Notice: Subject to any disclaimer, the term of this patent is extended or adjusted under 35 U.S.C. 154(b) by 0 days.

(21) Appl. No.: 09/295,966

(22) Filed: Apr. 21, 1999

Related U.S. Application Data

(60) Provisional application No. 60/084,014, filed on May 4, 1998.

(51) Int. Cl.$^7$ .............................................. G06F 12/14
(52) U.S. Cl. ...................................................... 713/201
(58) Field of Search ................................ 713/200, 201, 713/202, 165, 168, 193; 709/229; 380/200, 201, 230; 340/825.31, 825.34; 705/57, 58

(56) References Cited

U.S. PATENT DOCUMENTS

| | | | |
|---|---|---|---|
| 5,696,898 A | 12/1997 | Baker et al. ............ | 395/187.01 |
| 6,157,829 A | * 12/2000 | Grube et al. ............. | 455/414.1 |
| 6,233,686 B1 | 5/2001 | Dutta | |

FOREIGN PATENT DOCUMENTS

| | | |
|---|---|---|
| CA | 2226814 | 3/2003 |
| EP | 0 854 621 | 7/1998 |
| EP | 0854621 A | * 7/1998 |
| WO | WO 96/05549 | 2/1996 |
| WO | WO9605549 | * 2/1996 |
| WO | WO98/03927 | 1/1998 |
| WO | WO9826548 | * 6/1998 |
| WO | WO 98/26548 | 6/1998 |
| WO | WO 99/57660 | 11/1999 |
| WO | WO 00/16529 | 3/2000 |

\* cited by examiner

*Primary Examiner*—Pierre Elisca
(74) *Attorney, Agent, or Firm*—Christie, Parker & Hale, LLP

(57) ABSTRACT

A data redirection system for redirecting user's data based on a stored rule set. The redirection of data is performed by a redirection server, which receives the redirection rule sets for each user from an authentication and accounting server, and a database. Prior to using the system, users authenticate with the authentication and accounting server, and receive a network address. The authentication and accounting server retrieves the proper rule set for the user, and communicates the rule set and the user's address to the redirection server. The redirection server then implements the redirection rule set for the user's address. Rule sets are removed from the redirection server either when the user disconnects, or based on some predetermined event. New rule sets are added to the redirection server either when a user connects, or based on some predetermined event.

27 Claims, 1 Drawing Sheet

USER SPECIFIC AUTOMATIC DATA REDIRECTION SYSTEM

RELATED APPLICATION

This application claims priority of U.S. Provisional Application No. 60/084,014 filed May 4, 1998, the disclosure of which is incorporated fully herein by reference.

FIELD OF THE INVENTION

This invention relates to the field of Internet communications, more particularly, to a database system for use in dynamically redirecting and filtering Internet traffic.

BACKGROUND OF THE INVENTION

In prior art systems as shown in FIG. 1 when an Internet user establishes a connection with an Internet Service Provider (ISP), the user first makes a physical connection between their computer 100 and a dial-up networking server 102, the user provides to the dial-up networking server their user ID and password. The dial-up networking server then passes the user ID and password, along with a temporary Internet Protocol (IP) address for use by the user to the ISP's authentication and accounting server 104. A detailed description of the IP communications protocol is discussed in *Internetworking with TCP/IP*, 3rd ed., Douglas Comer, Prentice Hall, 1995, which is fully incorporated herein by reference. The authentication and accounting server, upon verification of the user ID and password using a database 106 would send an authorization message to the dial-up networking server 102 to allow the user to use the temporary IP address assigned to that user by the dial-up networking server and then logs the connection and assigned IP address. For the duration of that session, whenever the user would make a request to the Internet 110 via a gateway 108, the end user would be identified by the temporarily assigned IP address.

The redirection of Internet traffic is most often done with World Wide Web (WWW) traffic (more specifically, traffic using the HTTP (hypertext transfer protocol)). However, redirection is not limited to WWW traffic, and the concept is valid for all IP services. To illustrate how redirection is accomplished, consider the following example, which redirects a user's request for a WWW page (typically an html (hypertext markup language) file) to some other WWW page. First, the user instructs the WWW browser (typically software running on the user's PC) to access a page on a remote WWW server by typing in the URL (universal resource locator) or clicking on a URL link. Note that a URL provides information about the communications protocol, the location of the server (typically an Internet domain name or IP address), and the location of the page on the remote server. The browser next sends a request to the server requesting the page. In response to the user's request, the web server sends the requested page to the browser. The page, however, contains html code instructing the browser to request some other WWW page—hence the redirection of the user begins. The browser then requests the redirected WWW page according to the URL contained in the first page's html code. Alternately, redirection can also be accomplished by coding the page such that it instructs the browser to run a program, like a Java applet or the like, which then redirects the browser. One disadvantage with current redirection technology is that control of the redirection is at the remote end, or WWW server end—and not the local, or user end. That is to say that the redirection is performed by the remote server, not the user's local gateway.

Filtering packets at the Internet Protocol (IP) layer has been possible using a firewall device or other packet filtering device for several years. Although packet filtering is most often used to filter packets coming into a private network for security purposes, once properly programed, they can filter outgoing packets sent from users to a specific destination as well. Packet filtering can distinguish, and filter based on, the type of IP service contained within an IP packet. For example, the packet filter can determine if the packet contains FTP (file transfer protocol) data, WWW data, or Telnet session data. Service identification is achieved by identifying the terminating port number contained within each IP packet header. Port numbers are standard within the industry to allow for interoperability between equipment. Packet filtering devices allow network administrators to filter packets based on the source and/or destination information, as well as on the type of service being transmitted within each IP packet. Unlike redirection technology, packet filtering technology allows control at the local end of the network connection, typically by the network administrator. However, packet filtering is very limited because it is static. Once packet filtering rule sets are programed into a firewall or other packet filter device, the rule set can only be changed by manually reprogramming the device.

Packet filter devices are often used with proxy server systems, which provide access control to the Internet and are most often used to control access to the world wide web. In a typical configuration, a firewall or other packet filtering device filters all WWW requests to the Internet from a local network, except for packets from the proxy server. That is to say that a packet filter or firewall blocks all traffic originating from within the local network which is destined for connection to a remote server on port 80 (the standard WWW port number). However, the packet filter or firewall permits such traffic to and from the proxy server. Typically, the proxy server is programed with a set of destinations that are to be blocked, and packets destined for blocked addresses are not forwarded. When the proxy server receives a packet, the destination is checked against a database for approval. If the destination is allowed, the proxy server simply forwards packets between the local user and the remote server outside the firewall. However, proxy servers are limited to either blocking or allowing specific system terminals access to remote databases.

A recent system is disclosed in U.S. Pat. No. 5,696,898. This patent discloses a system, similar to a proxy server, that allows network administrators to restrict specific IP addresses inside a firewall from accessing information from certain public or otherwise uncontrolled databases (i.e., the WWW/Internet). According to the disclosure, the system has a relational database which allows network administrators to restrict specific terminals, or groups of terminals, from accessing certain locations. Similarly limited as a proxy server, this invention can only block or allow terminals' access to remote sites. This system is also static in that rules programmed into the database need to be reprogramming in order to change which locations specific terminals may access.

SUMMARY OF THE INVENTION

The present invention allows for creating and implementing dynamically changing rules, to allow the redirection, blocking, or allowing, of specific data traffic for specific users, as a function of database entries and the user's activity. In certain embodiments according to the present invention, when the user connects to the local network, as in the prior art system, the user's ID and password are sent to the authentication accounting server. The user ID and password are checked against information in an authentication database. The database also contains personalized filtering and redirection information for the particular user ID. During the connection process, the dial-up network server provides the authentication accounting server with the IP address that is going to be temporarily assigned to the user. The authentication accounting server then sends both the user's temporary IP address and all of the particular user's filter and redirection information to a redirection server. The IP address temporarily assigned to the end user is then sent back to the end user for use in connecting to the network.

Once connected to the network, all data packets sent to, or received by, the user include the user's temporary IP address in the IP packet header. The redirection server uses the filter and redirection information supplied by the authentication accounting server, for that particular IP address, to either allow packets to pass through the redirection server unmolested, block the request all together, or modify the request according to the redirection information.

When the user terminates the connection with the network, the dial-up network server informs the authentication accounting server, which in turn, sends a message to the redirection server telling it to remove any remaining filtering and redirection information for the terminated user's temporary IP address. This then allows the dial-up network to reassign that IP address to another user. In such a case, the authentication accounting server retrieves the new user's filter and redirection information from the database and passes it, with the same IP address which is now being used by a different user, to the redirection server. This new user's filter may be different from the first user's filter.

DETAILED DESCRIPTION OF THE INVENTION

Figure 1:
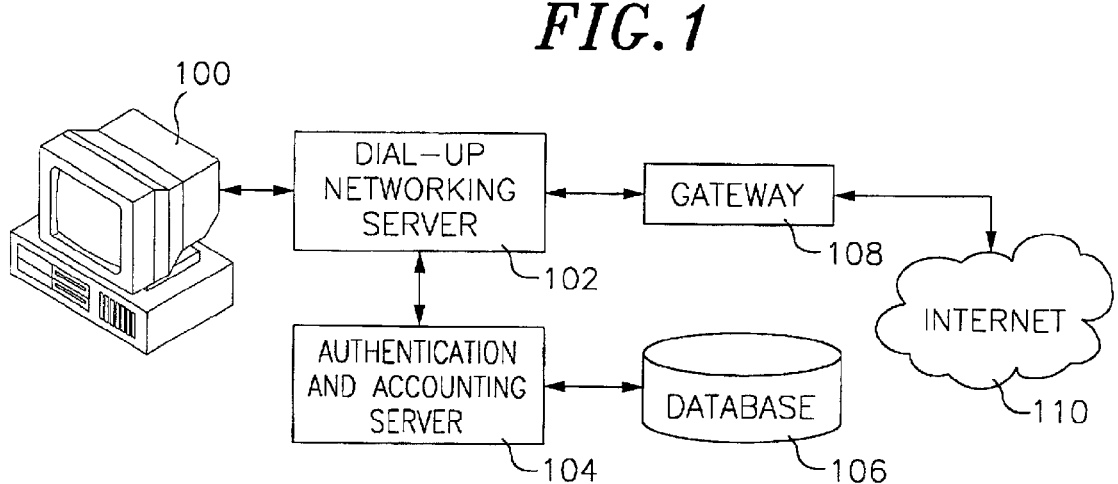
FIG. 1 is a block diagram of a typical Internet Service Provider environment.

In the following embodiments of the invention, common reference numerals are used to represent the same components. If the features of an embodiment are incorporated into a single system, these components can be shared and perform all the functions of the described embodiments.

Figure 2:
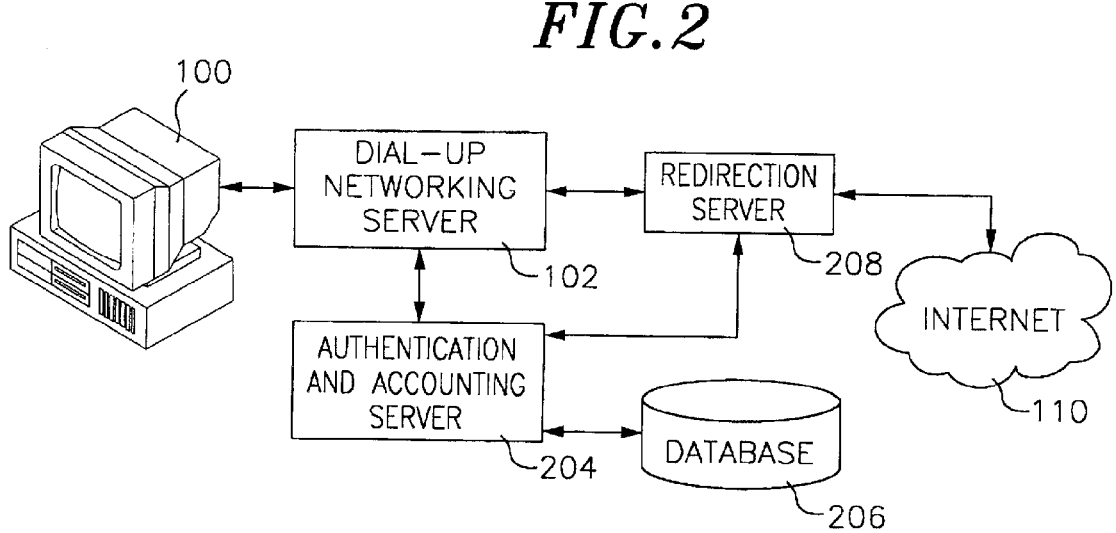
FIG. 2 is a block diagram of an embodiment of an Internet Service Provider environment with integrated redirection system.

FIG. 2. shows a typical Internet Service Provider (ISP) environment with integrated user specific automatic data redirection system. In a typical use of the system, a user employs a personal computer (PC) 100, which connects to the network. The system employs: a dial-up network server 102, an authentication accounting server 204, a database 206 and a redirection server 208.

The PC 100 first connects to the dial-up network server 102. The connection is typically created using a computer modem, however a local area network (LAN) or other communications link can be employed. The dial-up network server 102 is used to establish a communications link with the user's PC 100 using a standard communications protocol. In the preferred embodiment Point to Point Protocol (PPP) is used to establish the physical link between the PC 100 and the dial-up network server 102, and to dynamically assign the PC 100 an IP address from a list of available addresses. However, other embodiments may employ different communications protocols, and the IP address may also be permanently assigned to the PC 100. Dial-up network servers 102, PPP and dynamic IP address assignment are well known in the art.

An authentication accounting server with Auto-Navi component (hereinafter, authentication accounting server) 204 is used to authenticate user ID and permit, or deny, access to the network. The authentication accounting server 204 queries the database 206 to determine if the user ID is authorized to access the network. If the authentication accounting server 204 determines the user ID is authorized, the authentication accounting server 204 signals the dial-up network server 102 to assign the PC 100 an IP address, and the Auto-Navi component of the authentication accounting server 204 sends the redirection server 208 (1) the filter and redirection information stored in database 206 for that user ID and (2) the temporarily assigned IP address for the session. One example of an authentication accounting server is discussed in U.S. Pat. No. 5,845,070, which is fully incorporated here by reference. Other types of authentication accounting servers are known in the art. However, these authentication accounting servers lack an Auto-Navi component.

The system described herein operates based on user Id's supplied to it by a computer. Thus the system does not "know" who the human being "user" is at the keyboard of the computer that supplies a user ID. However, for the purposes of this detailed description, "user" will often be used as a short hand expression for "the person supplying inputs to a computer that is supplying the system with a particular user ID."

The database 206 is a relational database which stores the system data. FIG. 3 shows one embodiment of the database structure. The database, in the preferred embodiment, includes the following fields: a user account number, the services allowed or denied each user (for example: e-mail, Telnet, FTP, WWW), and the locations each user is allowed to access.

Rule sets are employed by the system and are unique for each user ID, or a group of user ID's. The rule sets specify elements or conditions about the user's session. Rule sets may contain data about a type of service which may or may not be accessed, a location which may or may not be accessed, how long to keep the rule set active, under what conditions the rule set should be removed, when and how to modify the rule set during a session, and the like. Rule sets may also have a preconfigured maximum lifetime to ensure their removal from the system.

The redirection server 208 is logically located between the user's computer 100 and the network, and controls the user's access to the network. The redirection server 208 performs all the central tasks of the system. The redirection server 208 receives information regarding newly established sessions from the authentication accounting server 204. The Auto-Navi component of the authentication accounting server 204 queries the database for the rule set to apply to each new session, and forwards the rule set and the currently assigned IP address to the redirection server 208. The redirection server 208 receives the IP address and rule set, and is programed to implement the rule set for the IP address, as well as other attendant logical decisions such as: checking data packets and blocking or allowing the packets as a function of the rule sets, performing the physical redirection of data packets based on the rule sets, and dynamically changing the rule sets based on conditions. When the redirection server 208 receives information regarding a terminated session from the authentication accounting server 204, the redirection server 208 removes any outstanding rule sets and information associated with the session. The redirection server 208 also checks for and removes expired rule sets from time to time.

In an alternate embodiment, the redirection server 208 reports all or some selection of session information to the database 206. This information may then be used for reporting, or additional rule set generation.

System Features Overview

In the present embodiment, each specific user may be limited to, or allowed, specific IP services, such as WWW, FTP and Telnet. This allows a user, for example, WWW access, but not FTP access or Telnet access. A user's access can be dynamically changed by editing the user's database record and commanding the Auto-Navi component of the authentication accounting server 204 to transmit the user's new rule set and current IP address to the redirection server 208.

A user's access can be "locked" to only allow access to one location, or a set of locations, without affecting other users' access. Each time a locked user attempts to access another location, the redirection server 208 redirects the user to a default location. In such a case, the redirection server 208 acts either as proxy for the destination address, or in the case of WWW traffic the redirection server 208 replies to the user's request with a page containing a redirection command.

A user may also be periodically redirected to a location, based on a period of time or some other condition. For example, the user will first be redirected to a location regardless of what location the user attempts to reach, then permitted to access other locations, but every ten minutes the user is automatically redirected to the first location. The redirection server 208 accomplishes such a rule set by setting an initial temporary rule set to redirect all traffic; after the user accesses the redirected location, the redirection server then either replaces the temporary rule set with the user's standard rule set or removes the rule set altogether from the redirection server 208. After a certain or variable time period, such as ten minutes, the redirection server 208 reinstates the rule set again.

The following steps describe details of a typical user session:

A user connects to the dial-up network server 102 through computer 100.

The user inputs user ID and password to the dial-up network server 102 using computer 100 which forwards the information to the authentication accounting server 204

The authentication accounting server 204 queries database 206 and performs validation check of user ID and password.

Upon a successful user authentication, the dial-up network server 102 completes the negotiation and assigns an IP address to the user. Typically, the authentication accounting server 204 logs the connection in the database 206.

The Auto-Navi component of the authentication accounting server 204 then sends both the user's rule set (contained in database 206) and the user's IP address (assigned by the dial-up network server 102) in real time to the redirection server 208 so that it can filter the user's IP packets.

The redirection server 208 programs the rule set and IP address so as to control (filter, block, redirect, and the like) the user's data as a function of the rule set.

The following is an example of a typical user's rule set, attendant logic and operation:

If the rule set for a particular user (i.e., user UserID-2) was such as to only allow that user to access the web site www.us.com, and permit Telnet services, and redirect all web access from any server at xyz.com to www.us.com, then the logic would be as follows:

The database 206 would contain the following record for user UserID-2:

```
ID                    UserID-2
Password:             secret
###############
Rule Sets ###
###############
#service    rule                           expire
http        www.us.com                     0
http        *.xyz.com=>www.us.com          0
``` the user initiates a session, and sends the correct user ID and password (UserID-2 and secret) to the dial-up network server 102. As both the user ID and password are correct, the authentication accounting server 204 authorizes the dial-up network server 102 to establish a session. The dial-up network server 102 assigns UserID-2 an IP address (for example, 10.0.0.1) to the user and passes the IP address to the authentication accounting server 204.

The Auto-Navi component of the authentication accounting server 204 sends both the user's rule set and the user's IP address (10.0.0.1) to the redirection server 208.

The redirection server 208 programs the rule set and IP address so as to filter and redirect the user's packets according to the rule set. The logic employed by the redirection server 208 to implement the rule set is as follows:

IF source IP-address=10.0.0.1 AND
  ( ((request type=HTTP) AND (destination address= www.us.com) ) OR (request type=Telnet)
  ) THEN ok.
IF source IP-address=10.0.0.1 AND
  ( (request type=HTTP) AND (destination address= *.xyz.com)
  ) THEN (redirect=www.us.com)

The redirection server 208 monitors all the IP packets, checking each against the rule set. In this situation, if IP address 10.0.0.1 (the address assigned to user ID UserID-2) attempts to send a packet containing HTTP data (i.e., attempts to connect to port 80 on any machine within the xyz.com domain) the traffic is redirected by the redirection server 208 to www.us.com. Similarly, if the user attempts to connect to any service other then HTTP at www.us.com or Telnet anywhere, the packet will simply be blocked by the redirection server 208.

When the user logs out or disconnects from the system, the redirection server will remove all remaining rule sets.

The following is another example of a typical user's rule set, attendant logic and operation:

If the rule set for a particular user (i.e., user UserID-3) was to force the user to visit the web site www.widgetsell.com, first, then to have unfettered access to other web sites, then the logic would be as follows:

The database 206 would contain the following record for user UserID-3;

| ID | UserID-3 | |
|---|---|---|
| Password: | top-secret | |
| ############### | | |
| ### Rule Sets ### | | |
| ############### | | |
| #service | rule | expire |
| http | *=>www.widgetsell.com | 1x | the user initiates a session, and sends the correct user ID and password (UserID-3 and top-secret) to the dial-up network server 102. As both the user ID and password are correct, the authentication accounting server 204 authorizes the dial-up network server 102 to establish a session. The dial-up network server 102 assigns user ID 3 an IP address (for example, 10.0.0.1) to the user and passes the IP address to the authentication accounting server 204.

The Auto-Navi component of the authentication accounting server 204 sends both the user's rule set and the user's IP address (10.0.0.1) to the redirection server 208.

The redirection server 208 programs the rule set and IP address so as to filter and redirect the user's packets according to the rule set. The logic employed by the redirection server 208 to implement the rule set is as follows:

IF source IP-address=10.0.0.1 AND
 (request type=HTTP) THEN (redirect= www.widgetsell.com)
THEN SET NEW RULE
IF source IP-address=10.0.0.1 AND
 (request type=HTTP) THEN ok.

The redirection server 208 monitors all the IP packets, checking each against the rule set. In this situation, if IP address 10.0.0.1 (the address assigned to user ID UserID-3) attempts to send a packet containing HTTP data (i.e., attempts to connect to port 80 on any machine) the traffic is redirected by the redirection server 208 to www.widgetsell.com. Once this is done, the redirection server 208 will remove the rule set and the user if free to use the web unmolested.

When the user logs out or disconnects from the system, the redirection server will remove all remaining rule sets.

In an alternate embodiment a user may be periodically redirected to a location, based on the number of other factors, such as the number of locations accessed, the time spent at a location, the types of locations accessed, and other such factors.

A user's account can also be disabled after the user has exceeded a length of time. The authentication accounting server 204 keeps track of user's time online. Prepaid use subscriptions can thus be easily managed by the authentication accounting Server 204.

In yet another embodiment, signals from the Internet 110 side of redirection server 208 can be used to modify rule sets being used by the redirection server. Preferably, encryption and/or authentication are used to verify that the server or other computer on the Internet 110 side of redirection server 208 is authorized to modify the rule set or rule sets that are being attempted to be modified. An example of this embodiment is where it is desired that a user be redirected to a particular web site until the fill out a questionnaire or satisfy some other requirement on such a web site. In this example, the redirection server redirects a user to a particular web site that includes a questionnaire. After this web site receives acceptable data in all required fields, the web site then sends an authorization to the redirection server that deletes the redirection to the questionnaire web site from the rule set for the user who successfully completed the questionnaire. Of course, the type of modification an outside server can make to a rule set on the redirection server is not limited to deleting a redirection rule, but can include any other type of modification to the rule set that is supported by the redirection server as discussed above.

It will be clear to one skilled in the art that the invention may be implemented to control (block, allow and redirect) any type of service, such as Telnet, FTP, WWW and the like. The invention is easily programmed to accommodate new services or networks and is not limited to those services and networks (e.g., the Internet) now know in the art.

It will also be clear that the invention may be implemented on a non-IP based networks which implement other addressing schemes, such as IPX, MAC addresses and the like. While the operational environment detailed in the preferred embodiment is that of an ISP connecting users to the Internet, it will be clear to one skilled in the art that the invention may be implemented in any application where control over users' access to a network or network resources is needed, such as a local area network, wide area network and the like. Accordingly, neither the environment nor the communications protocols are limited to those discussed.

What is claimed is:

1. A system comprising:
 a database with entries correlating each of a plurality of user IDs with an individualized rule set;
 a dial-up network server that receives user IDs from users' computers;
 a redirection server connected to the dial-up network server and a public network, and
 an authentication accounting server connected to the database, the dial-up network server and the redirection server;
 wherein the dial-up network server communicates a first user ID for one of the users' computers and a temporarily assigned network address for the first user ID to the authentication accounting server;
 wherein the authentication accounting server accesses the database and communicates the individualized rule set that correlates with the first user ID and the temporarily assigned network address to the redirection server; and
 wherein data directed toward the public network from the one of the users' computers are processed by the redirection server according to the individualized rule set.

2. The system of claim 1, wherein the redirection server further provides control over a plurality of data to and from the users' computers as a function of the individualized rule set.

3. The system of claim 1, wherein the redirection server further blocks the data to and from the users' computers as a function of the individualized rule set.

4. The system of claim 1, wherein the redirection server further allows the data to and from the users' computers as a function of the individualized rule set.

5. The system of claim 1, wherein the redirection server further redirects the data to and from the users' computers as a function of the individualized rule set.

6. The system of claim 1, wherein the redirection server further redirects the data from the users' computers to multiple destinations as a function of the individualized rule set.

7. The system of claim 1, wherein the database entries for a plurality of the plurality of users' IDs are correlated with a common individualized rule set.

8. In a system comprising a database with entries correlating each of a plurality of user IDs with an individualized rule set; a dial-up network server that receives user IDs from users' computers; a redirection server connected to the dial-up network server and a public network, and an authentication accounting server connected to the database, the dial-up network server and the redirection server, the method comprising the steps of:

communicating a first user ID for one of the users' computers and a temporarily assigned network address for the first user ID from the dial-up network server to the authentication accounting server;

communicating the individualized rule set that correlates with the first user ID and the temporarily assigned network address to the redirection server from the authentication accounting server;

and processing data directed toward the public network from the one of the users' computers according to the individualized rule set.

9. The method of claim 8, further including the step of controlling a plurality of data to and from the users' computers as a function of the individualized rule set.

10. The method of claim 8, further including the step of blocking the data to and from the users' computers as a function of the individualized rule set.

11. The method of claim 8, further including the step of allowing the data to and from the users' computers as a function of the individualized rule set.

12. The method of claim 8, further including the step of redirecting the data to and from the users' computers as a function of the individualized rule set.

13. The method of claim 8, further including the step of redirecting the data from the users' computers to multiple destinations a function of the individualized rule set.

14. The method of claim 8, further including the step of creating database entries for a plurality of the plurality of users' IDs, the plurality of users' ID further being correlated with a common individualized rule set.

15. A system comprising:

a redirection server programed with a user's rule set correlated to a temporarily assigned network address;

wherein the rule set contains at least one of a plurality of functions used to control passing between the user and a public network;

wherein the redirection server is configured to allow automated modification of at least a portion of the rule set correlated to the temporarily assigned network address; and wherein the redirection server is configured to allow modification of at least a portion of the rule set as a function of some combination of time, data transmitted to or from the user, or location the user access.

16. The system of claim 15, wherein the redirection server is configured to allow modification of at least a portion of the rule set as a function of time.

17. The system of claim 15, wherein the redirection server is configured to allow modification of at least a portion of the rule set as a function of the data transmitted to or from the user.

18. The system of claim 15, wherein the redirection server is configured to allow modification of at least a portion of the rule set as a function of the location or locations the user access.

19. The system of claim 15, wherein the redirection server is configured to allow the removal or reinstatement of at least a portion of the rule set as a function of time.

20. The system of claim 15, wherein the redirection server is configured to allow the removal or reinstatement of at least a portion of the rule set as a function of the data transmitted to or from the user.

21. The system of claim 15, wherein the redirection server is configured to allow the removal or reinstatement of at least a portion of the rule set as a function of the location or locations the user access.

22. The system of claim 15, wherein the redirection server is configured to allow the removal or reinstatement of at least a portion of the rule set as a function of some combination of time, data transmitted to or from the user, or location or locations the user access.

23. The system of claim 15, wherein the redirection server has a user side that is connected to a computer using the temporarily assigned network address and a network side connected to a computer network and wherein the computer using the temporarily assigned network address is connected to the computer network through the redirection server.

24. The system of claim 23 wherein instructions to the redirection server to modify the rule set are received by one or more of the user side of the redirection server and the network side of the redirection server.

25. In a system comprising a redirection server containing a user's rule set correlated to a temporarily assigned network address wherein the user's rule set contains at least one of a plurality of functions used to control data passing between the user and a public network; the method comprising the step of:

modifying at least a portion of the user's rule set while the user's rule set remains correlated to the temporarily assigned network address in the redirection server; and wherein the redirection server has a user side that is connected to a computer using the temporarily assigned network address and a network address and a network side connected to a computer network and wherein the computer using the temporarily assigned network address is connected to the computer network through the redirection server and the method further includes the step of receiving instructions by the redirection server to modify at least a portion of the user's rule set through one or more of the user side of the redirection server and the network side of the redirection server.

26. The method of claim 25, further including the step of modifying at least a portion of the user's rule set as a function of one or more of: time, data transmitted to or from the user, and location or locations the user access.

27. The method of claim 25, further including the step of removing or reinstating at least a portion of the user's rule set as a function of one or more of: time, the data transmitted to or from the user and the location or locations the user access.

* * * * *

(12) EX PARTE REEXAMINATION CERTIFICATE (8926th)
United States Patent
Ikudome et al.

(10) Number: US 6,779,118 C1
(45) Certificate Issued: Mar. 27, 2012

(54) USER SPECIFIC AUTOMATIC DATA REDIRECTION SYSTEM

(75) Inventors: Koichiro Ikudome, Arcadia, CA (US); Moon Tai Yeung, Alhambra, CA (US)

(73) Assignee: Linksmart Wireless Technology, LLC, Pasadena, CA (US)

Reexamination Request:
No. 90/009,301, Dec. 17, 2008

Reexamination Certificate for:
Patent No.: 6,779,118
Issued: Aug. 17, 2004
Appl. No.: 09/295,966
Filed: Apr. 21, 1999

Related U.S. Application Data
(60) Provisional application No. 60/084,014, filed on May 4, 1998.

(51) Int. Cl.
*H04L 29/06* (2006.01)
*H04L 29/00* (2006.01)

(52) U.S. Cl. ............................................. 726/7; 726/14
(58) Field of Classification Search ........................ 726/8
See application file for complete search history.

(56) References Cited

To view the complete listing of prior art documents cited during the proceeding for Reexamination Control Number 90/009,301, please refer to the USPTO's public Patent Application Information Retrieval (PAIR) system under the Display References tab.

*Primary Examiner* — Samuel Rimell

(57) ABSTRACT

A data redirection system for redirecting user's data based on a stored rule set. The redirection of data is performed by a redirection server, which receives the redirection rule sets for each user from an authenication and accounting server, and a database. Prior to using the system, users authenticate with the authenication and accounting server, and receive a network address. The authentication and accounting server retrieves the proper rule set for the user, and communicates the rule set and the user's address to the redirection server. The redirection server then implements the redirection rule set for the user's address. Rule sets are removed from the redirection server either when the user disconnects, or based on some predetermined event. New rule sets are added to the redirection server either when a user connects, or based on some predetermined event.

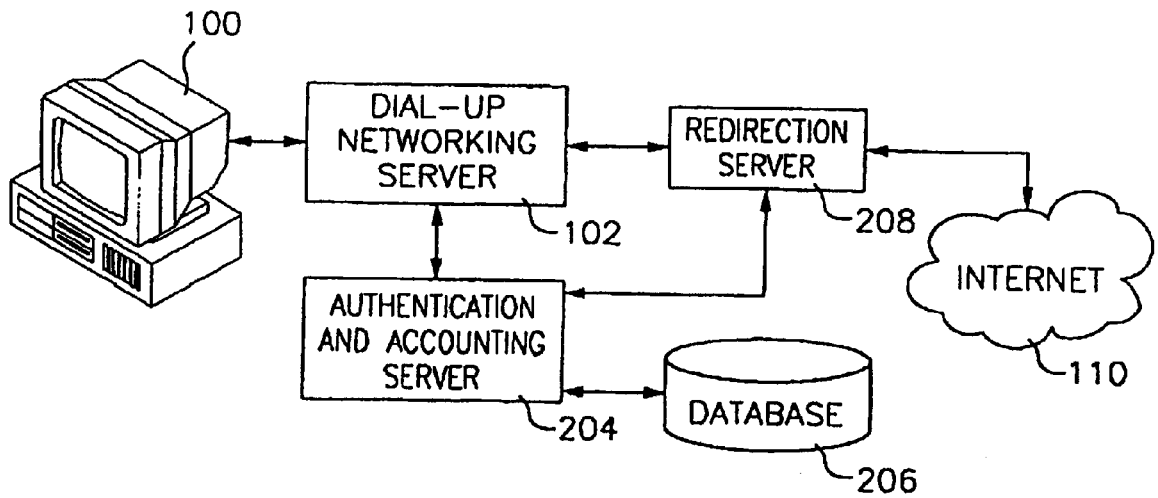

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2-7 and 9-14 is confirmed.

Claims 1, 8, 15 and 25 are cancelled.

Claims 16-23 and 26-27 are determined to be patentable as amended.

Claim 24, dependent on an amended claim, is determined to be patentable.

New claims 28-90 are added and determined to be patentable.

16. [The system of claim 15,] *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;*
*wherein the redirection server is configured to allow automated modification of at least a portion of the rule set as a function of some combination of time, data transmitted to or from the user, or location the user accesses; and*
wherein the redirection server is configured to allow modification of at least a portion of the rule set as a function of time.

17. [The system of claim 15,] *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;*
*wherein the redirection server is configured to allow automated modification of at least a portion of the rule set as a function of some combination of time, data transmitted to or from the user, or location the user accesses; and*
wherein the redirection server is configured to allow modification of at least a portion of the rule set as a function of the data transmitted to or from the user.

18. [The system of claim 15,] *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;*
*wherein the redirection server is configured to allow automated modification of at least a portion of the rule set as a function of some combination of time, data transmitted to or from the user, or location the user accesses; and*
wherein the redirection server is configured to allow modification of at least a portion of the rule set as a function of the location or locations the user [access] *accesses.*

19. [The system of claim 15,] *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;*
*wherein the redirection server is configured to allow automated modification of at least a portion of the rule set as a function of some combination of time, data transmitted to or from the user, or location the user accesses; and*
wherein the redirection server is configured to allow the removal or reinstatement of at least a portion of the rule set as a function of time.

20. [The system of claim 15,] *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;*
*wherein the redirection server is configured to allow automated modification of at least a portion of the rule set as a function of some combination of time, data transmitted to or from the user, or location the user accesses; and*
wherein the redirection server is configured to allow the removal or reinstatement of at least a portion of the rule set as a function of the data transmitted to or from the user.

21. [The system of claim 15,] *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;* wherein the redirection server is configured to allow automated modification of at least a portion of the rule set as a function of some combination of time, data transmitted to or from the user, or location the user accesses; and wherein the redirection server is configured to allow the removal or reinstatment of at least a portion of the rule set as a function of the location or locations the user [access]*accesses.*

22. [The system of claim 15,] *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;*
*wherein the redirection server is configured to allow automated modification of at least a portion of the rule set as a function of some combination of time, data transmitted to or from the user, or location the user accesses; and* wherein the redirection server is configured to allow the removal or reinstatement of at least a portion of the rule set as a function of some combination of time, data transmitted to or from the user, or location or locations the user [access] *accesses.*

23. [The system of claim 15,] *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;*
*wherein the redirection server is configured to allow automated modification of at least a portion of the rule set as a function of some combination of time, data transmitted to or from the user, or location the user accesses; and* wherein the redirection server has a user side that is connected to a computer using the temporarily assigned network address and a network side connected to a computer network and wherein the computer using the temporarily assigned network address is connected to the computer network through the redirection server.

26. The method of claim 25, further including the step of modifying at least a portion of the user's rule set as a function of one or more of: time, data transmitted to or from the user, and location or locations the user [access] *accesses.*

27. The method of claim 25, further including the step of removing or reinstating at least a portion of the user's rule set as a function of one or more of: time, the data transmitted to or from the user and [the] *a* location or locations the user [access] *accesses.*

28. The system of claim 1, wherein the individualized rule set includes at least one rule as a function of a type of IP (Internet Protocol) service.

29. The system of claim 1, wherein the individualized rule set includes an initial temporary rule set and a standard rule set, and wherein the redirection server is configured to utilize the temporary rule set for an initial period of time and to thereafter utilize the standard rule set.

30. The system of claim 1, wherein the individualized rule set includes at least one rule allowing access based on a request type and a destination address.

31. The system of claim 1, wherein the individualized rule set includes at least one rule redirecting the data to a new destination address based on a request type and an attempted destination address.

32. The method of claim 8, wherein the individualized rule set includes at least one rule as a function of a type of IP (Internet Protocol) service.

33. The method of claim 8, wherein the individualized rule set includes an initial temporary rule set and a standard rule set, and wherein the redirection server is configured to utilize the temporary rule set for an initial period of time and to thereafter utilize the standard rule set.

34. The method of claim 8, wherein the individualized rule set includes at least one rule allowing access based on a request type and a destination address.

35. The method of claim 8, wherein the individualized rule set includes at least one rule redirecting the data to a new destination address based on a request type and an attempted destination address.

36. *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;*
*wherein the redirection server is configured to allow automated modification of at least a portion of the rule set as a function of some combination of time, data transmitted to or from the user, or location the user accesses; and*
*wherein the modified rule set includes at least one rule as a function of a type of IP (Internet Protocol) service.*

37. *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;*
*wherein the redirection server is configured to allow automated modification of at least a portion of the rule set as a function of some combination of time, data transmitted to or from the user, or location the user accesses; and*
*wherein the modified rule set includes an initial temporary rule set and a standard rule set, and wherein the redirection server is configured to utilize the temporary rule set for an initial period of time and to thereafter utilize the standard rule set.*

38. *A system comprising:*
*a redirection server programmed with a user's rule set correlated to a temporarily assigned network address; wherein the rule set contains at least one of a plurality of functions used to control data passing between the user and a public network;*
*wherein the redirection server is configured to allow automated modification of at least a portion of the rule set correlated to the temporarily assigned network address;* wherein the redirection server is configured to allow automated modification of at least a portion of the rule set as a function of some combination of time, data transmitted to or from the user, or location the user accesses; and wherein the modified rule set includes at least one rule allowing access based on a request type and a destination address.

39. A system comprising:

a redirection server programmed with a user's rule set correlated to a temporarily assigned network address; wherein the rule set contains at least one of a plurality of functions used to control data passing between the user and a public network;

wherein the redirection server is configured to allow automated modification of at least a portion of the rule set correlated to the temporarily assigned network address;

wherein the redirection server is configured to allow automated modification of at least a portion of the rule set as a function of some combination of time, data transmitted to or from the user, or location the user accesses; and wherein the modified rule set includes at least one rule redirecting the data to a new destination address based on a request type and an attempted destination address.

40. The method of claim 25, wherein the modified rule set includes at least one rule as a function of a type of IP (Internet Protocol) service.

41. The method of claim 25, wherein the modified rule set includes an initial temporary rule set and a standard rule set, and wherein the redirection server is configured to utilize the temporary rule set for an initial period of time and to thereafter utilize the standard rule set.

42. The method of claim 25, wherein the modified rule set includes at least one rule allowing access based on a request type and a destination address.

43. The method of claim 25, wherein the modified rule set includes at least one rule redirecting the data to a new destination address based on a request type and an attempted destination address.

44. A system comprising:

a database with entries correlating each of a plurality of user IDs with an individualized rule set;

a dial-up network server that receives user IDs from users' computers;

a redirection server connected between the dial-up network server and a public network, and an authentication accounting server connected to the database, the dial-up network server and the redirection server;

wherein the dial-up network server communicates a first user ID for one of the users' computers and a temporarily assigned network address for the first user ID to the authentication accounting server;

wherein the authentication accounting server accesses the database and communicates the individualized rule set that correlates with the first user ID and the temporarily assigned network address to the redirection server; and wherein data directed toward the public network from the one of the users' computers are processed by the redirection server according to the individualized rule set.

45. The system of claim 44, wherein the redirection server further provides control over a plurality of data to and from the users' computers as a function of the individualized rule set.

46. The system of claim 44, wherein the redirection server further blocks the data to and from the users' computers as a function of the individualized rule set.

47. The system of claim 44, wherein the redirection server further allows the data to and from the users' computers as a function of the individualized rule set.

48. The system of claim 44, wherein the redirection server further redirects the data to and from the users' computers as a function of the individualized rule set.

49. The system of claim 44, wherein the redirection server further redirects the data from the users' computers to multiple destinations as a function of the individualized rule set.

50. The system of claim 44, wherein the database entries for a plurality of the plurality of users' IDs are correlated with a common individualized rule set.

51. The system of claim 44, wherein the individualized rule set includes at least one rule as a function of a type of IP (Internet Protocol) service.

52. The system of claim 44, wherein the individualized rule set includes an initial temporary rule set and a standard rule set, and wherein the redirection server is configured to utilize the temporary rule set for an initial period of time and to thereafter utilize the standard rule set.

53. The system of claim 44, wherein the individualized rule set includes at least one rule allowing access based on a request type and a destination address.

54. The system of claim 44, wherein the individualized rule set includes at least one rule redirecting the data to a new destination address based on a request type and an attempted destination address.

55. The system of claim 44, wherein the redirection server is configured to redirect data from the users' computers by replacing a first destination address in an IP (Internet protocol) packet header by a second destination address as a function of the individualized rule set.

56. In a system comprising a database with entries correlating each of a plurality of user IDs with an individualized rule set; a dial-up network server that receives user IDs from users' computers; a redirection server connected between the dial-up network server and a public network, and an authentication accounting server connected to the database, the dial-up network server and the redirection servers, a method comprising the steps of:

communicating a first user ID for one of the users' computers and a temporarily assigned network address for the first user ID from the dial-up network server to the authentication accounting server;

communicating the individualized rule set that correlates with the first user ID and the temporarily assigned network address to the redirection server from the authentication accounting server;

and processing data directed toward the public network from the one of the users' computers according to the individualized rule set.

57. The method of claim 56, further including the step of controlling a plurality of data to and from the users' computers as a function of the individualized rule set.

58. The method of claim 56, further including the step of blocking the data to and from the users' computers as a function of the individualized rule set.

59. The method of claim 56, further including the step of allowing the data to and from the users' computers as a function of the individualized rule set.

60. The method of claim 56, further including the step of redirecting the data to and from the users' computers as a function of the individualized rule set.

61. The method of claim 56, further including the step of redirecting the data from the users' computers to multiple destinations a function of the individualized rule set.

62. The method of claim 56, further including the step of creating database entries for a plurality of the plurality of users' IDs, the plurality of users' ID further being correlated with a common individualized rule set.

63. The method of claim 56, wherein the individualized rule set includes at least one rule as a function of a type of IP (Internet Protocol) service.

64. The method of claim 56, wherein the individualized rule set includes an initial temporary rule set and a standard rule set, and wherein the redirection server is configured to utilize the temporary rule set for an intial period of time and to thereafter utilize the standard rule set.

65. The method of claim 56, wherein the individualized rule set includes at least one rule allowing access based on a request type and a destination address.

66. The method of claim 56, wherein the individualized rule set includes at least one rule redirecting the data to a new destination address based on a request type and an attempted destination address.

67. The method of claim 56, wherein the redirection server is configured to redirect data from the users' computers by replacing a first destination address in an IP (Internet protocol) packet header by a second destination address as a function of the individualized rule set.

68. A system comprising:
   a redirection server connected between a user computer and a public network, the redirection server programmed with a users' rule set correlated to a temporarily assigned network address;
   wherein the rule set contains at least one of a plurality of functions used to control data passing between the user and a public network;
   wherein the redirection server is configured to allow automated modification of at least a portion of the rule set correlated to the temporarily assigned network address; and
   wherein the redirection server is configured to allow automated modification of at least a portion of the rule set as a function of some combination of time, data transmitted to or from the user, or location the user accesses.

69. The system of claim 68, wherein the redirection server is configured to allow modification of at least a portion of the rule set as a function of time.

70. The system of claim 68, wherein the redirection server is configured to allow modification of at least a portion of the rule set as a function of the data transmitted to or from the user.

71. The system of claim 68, wherein the redirection server is configured to allow modification of at least a portion of the rule set as a function of the location or locations the user accesses.

72. The system of claim 68, wherein the redirection server is configured to allow the removal or reinstatement of at least a portion of the rule set as a function of time.

73. The system of claim 68, wherein the redirection server is configured to allow the removal or reinstatement of at least a portion of the rule set as a function of the data transmitted to or from the user.

74. The system of claim 68, wherein the redirection server is configured to allow the removal or reinstatement of at least a portion of the rule set as a function of the location or locations the user accesses.

75. The system of claim 68, wherein the redirection server is configured to allow the removal or reinstatement of at least a portion of the rule set as a function of some combination of time, data transmitted to or from the user, or location or locations the user accesses.

76. The system of claim 68, wherein the redirection server has a user side that is connected to a computer using the temporarily assigned network address and a network side connected to a computer network and wherein the computer using the temporarily assigned network address is connected to the computer network through the redirection server.

77. The system of claim 68 wherein instructions to the redirection server to modify the rule set are received by one or more of the user side of the redirection server and the network side of the redirection server.

78. The system of claim 68, wherein the modified rule set includes at least one rule as a function of a type of IP (Internet Protocol) service.

79. The system of claim 68, wherein the modified rule set includes an initial temporary rule set and a standard rule set, and wherein the redirection server is configured to utilize the temporary rule set for an initial period of time and to thereafter utilize the standard rule set.

80. The system of claim 68, wherein the modified rule set includes at least one rule allowing access based on a request type and a destination address.

81. The system of claim 68, wherein the modified rule set includes at least one rule redirecting the data to a new destination address based on a request type and an attempted destination address.

82. The system of claim 68, wherein the redirection server is configured to redirect data from the users' computers by replacing a first destination address in an IP (Internet protocol) packet header by a second destination address as a function of the modified rule set.

83. In a system comprising a redirection server connected between a user computer and a public network, the redirection server containing a user's rule set correlated to a temporarily assigned network address wherein the user's rule set contains at least one of a plurality of functions used to control data passing between the user and a public network; a method comprising the step of:
   modifying at least a portion of the user's rule set while the user's rule set remains correlated to the temporarily assigned network address in the redirection server; and
   wherein the redirection server has a user side that is connected to a computer using the temporarily assigned network address and a network address and a network side connected to a computer network and
   wherein the computer using the temporarily assigned network address is connected to the computer network through the redirection server and the method further includes the step of receiving instructions by the redirection server to modify at least a portion of the user's rule set through one or more of the user side of the redirection server and the network side of the redirection server.

84. The method of claim 83, further including the step of modifying at least a portion of the user's rule set as a function of one or more of: time, data transmitted to or from the user, and location or locations the user accesses.

85. The method of claim 83, further including the step of removing or reinstating at least a portion of the user's rule set as a function of one or more of: time, the data transmitted to or from the user and a location or locations the user accesses.

86. The method of claim 83, wherein the modified rule set includes at least one rule as a function of a type of IP (Internet Protocol) service.

87. The method of claim 83, wherein the modified rule set includes an initial temporary rule set and a standard rule

*set, and wherein the redirection server is configured to utilize the temporary rule set for an initial period of time and to thereafter utilize the standard rule set.*

88. *The method of claim 83, wherein the modified rule set includes at least one rule allowing access based on a request type and a destination address.*

89. *The method of claim 83, wherein the modified rule set includes at least one rule redirecting the data to a new destination address based on a request type and an attempted destination address.*

90. *The method of claim 83, wherein the redirection server is configured to redirect data from the users' computers by replacing a first destination address in an IP (Internet Protocol) packet header by a second destination address as a function of the individualized rule set.*

\* \* \* \* \*

(12) INTER PARTES REEXAMINATION CERTIFICATE (1128th)
United States Patent
Ikudome et al.

(10) Number: US 6,779,118 C2
(45) Certificate Issued: Jun. 8, 2015

(54) USER SPECIFIC AUTOMATIC DATA REDIRECTION SYSTEM

(75) Inventors: Koichiro Ikudome, Arcadia, CA (US); Moon Tai Yeung, Alhambra, CA (US)

(73) Assignee: LINKSMART WIRELESS TECHNOLOGY, LLC, Pasadena, CA (US)

Reexamination Request:
No. 95/002,035, Sep. 12, 2012

No. 90/012,342, Jun. 8, 2012

Reexamination Certificate for:
Patent No.: 6,779,118
Issued: Aug. 17, 2004
Appl. No.: 09/295,966
Filed: Apr. 21, 1999

Reexamination Certificate C1 6,779,118 issued Mar. 27, 2012

Related U.S. Application Data

(60) Provisional application No. 60/084,014, filed on May 4, 1998.

(51) Int. Cl.
*H04L 29/06* (2006.01)
(52) U.S. Cl.
CPC ..................................... *H04L 29/06* (2013.01)

(58) Field of Classification Search
None
See application file for complete search history.

(56) References Cited

To view the complete listing of prior art documents cited during the proceedings for Reexamination Control Numbers 95/002,035 and 90/012,342, please refer to the USPTO's public Patent Application Information Retrieval (PAIR) system under the Display References tab.

*Primary Examiner* — Jalatee Worjloh

(57) ABSTRACT

A data redirection system for redirecting user's data based on a stored rule set. The redirection of data is performed by a redirection server, which receives the redirection rule sets for each user from an authenication and accounting server, and a database. Prior to using the system, users authenticate with the authenication and accounting server, and receive a network address. The authentication and accounting server retrieves the proper rule set for the user, and communicates the rule set and the user's address to the redirection server. The redirection server then implements the redirection rule set for the user's address. Rule sets are removed from the redirection server either when the user disconnects, or based on some predetermined event. New rule sets are added to the redirection server either when a user connects, or based on some predetermined event.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1, 8, 15 and 25 were previously cancelled.
Claims 2-7, 9-14, 16-24 and 26-90 are cancelled.

\* \* \* \* \*